United States Patent [19]

Taff

[11] 4,386,726  
[45] Jun. 7, 1983

[54] ADAPTER FOR SOCKET WELDS
[75] Inventor: James T. Taff, Simi Valley, Calif.
[73] Assignee: Dimetrics, Inc., Diamond Springs, Calif.
[21] Appl. No.: 211,358
[22] Filed: Nov. 28, 1980
[51] Int. Cl.³ .............................................. B23K 37/02
[52] U.S. Cl. ..................................... 228/29; 219/60 A
[58] Field of Search ........................... 228/29, 45, 124; 219/60 A, 124.01, 124.02, 124.22, 124.31, 219/124.33, 124.4, 124.5

[56] References Cited
U.S. PATENT DOCUMENTS

| | | | |
|---|---|---|---|
| 3,290,032 | 12/1966 | Brouwer | 219/124.02 |
| 3,515,844 | 1/1969 | Colarossi | 219/124.22 |
| 3,841,547 | 10/1974 | Bartley | 228/29 |
| 4,161,640 | 7/1979 | Bromusch et al. | 219/60 A |
| 4,216,365 | 8/1980 | Peyrot | 219/60 A |

Primary Examiner—Nicholas P. Godici  
Assistant Examiner—M. Jordan  
Attorney, Agent, or Firm—Ralph B. Pastoriza

[57] ABSTRACT

The adapter is arranged to be mounted to the horseshoe travelling carriage for a weld head in a pipe welding system to support the torch or weld head at an acute angle to the plane of rotation of the travelling carriage and thus to a plane normal to a pipe axis. This positioning of the weld head or torch facilitates socket welding; that is, welding about the intersection point of larger and small diameter pipes. The adapter comprises a mounting plate and a movable plate supported at an angle to the mounting plate by appropriate guide rods. Left and right racks adjacent to the guide rods and secured to the movable plate are driven by a single pinion bridging the racks and mounted between fixtures secured to the mounting plate. The movable plate is constrained from movement in a plane parallel to itself by the guide rods. A motor operates the pinion so that the weld head can be moved closer to and further from the socket area to be welded as appears necessary to effect a high quality weld.

1 Claim, 5 Drawing Figures

_4,386,726_

ADAPTER FOR SOCKET WELDS

This invention relates generally to welding operations and more particularly to an adapter for use in making socket welds.

BACKGROUND OF THE INVENTION

In my copending patent application Ser. No. 211,359 filed Nov. 28, 1980 and entitled FULL FUNCTION IN-PLACE WELD HEAD there is shown and described the weld head structure supporting a horseshoe-shaped carriage mounting a welding torch in such a manner that the horseshoe carriage can rotate about a pipe axis to effect a complete 360° weld.

The torch itself is oriented to extend radially inwardly towards the axis of the pipe so as to be generally normal to a tangent to the pipe at the pipe surface as well as normal to a lateral line parallel to the pipe axis on the pipe surface.

There are certain types of welds, however, referred to as "socket welds" wherein a higher quality weld can be achieved if the torch can be angulated so as to better treat the opposing surfaces to be welded together. Such socket welds are defined between two surfaces which intersect at an angle. For example, where a pipe of one diameter is being welded to the end of a pipe of a larger diameter and there is a face or front surface on the pipe of larger diameter normal to the axis of the pipe, the weld area is defined by surfaces which intersect at essentially right angles and extend annularly over 360°. To effect a weld at this intersection, the torch would best be oriented at 45° rather than extending radially inwardly. In fact, it would be difficult to effect the weld at the proper location if the torch extended inwardly since the side of the torch would interfere with the facing surface of the larger diameter pipe. To effect a weld at the intersection point would by necessity require that the torch head be angulated to "reach into" the weld area.

With presently available equipment such as my heretofore referred to automatic 360° in-place welding system, it would not be possible with the torch oriented as it is in such system to effect suitable socket welds. The same situation obtains for larger welding apparatuses incorporating travelling carriages for carrying a torch head about the circumference of a pipe either externally or internally. As a result, it has been necessary to make most socket welds by hand rather than by automatic equipment.

BRIEF DESCRIPTION OF THE PRESENT INVENTION

With the foregoing considerations in mind, the present invention contemplates a unique adapter plate which can be secured to the horseshoe-shaped travelling carriage of my heretofore referred-to in-place welding system or, for that matter, on any travelling carriage in such a manner that the adapter plate will support the weld head at a desired acute angle to the plane of travel of the carriage; that is, the plane normal to the pipe axis. Further, the adapter plate is designed so that the torch head can be moved closer to or further from the socket weld area always along the direction of the acute angle.

Briefly, the adapter plate in accord with this invention includes a mounting plate for securement to a weld head carriage and a movable plate forming an acute angle with the mounting plate for carrying the welding torch. Appropriate means are provided coupling the movable plate to the mounting plate for guided movement of the movable plate in its own plane further from and closer to the vertex of the acute angle so that a torch carried on the movable plate can be moved closer to and further from a socket area to be welded, all as described above.

In the preferred embodiment of this invention, the mounting plate in the adapter also carries a motor for automatically moving the movable plate carrying the welding torch in accord with the desired program to provide for a high quality socket weld.

BRIEF DESCRIPTION OF THE DRAWINGS

A better understanding of this invention will be had by referring to a preferred embodiment thereof as described in the accompanying drawings in which.

DETAILED DESCRIPTION OF THE INVENTION

Figure 1:
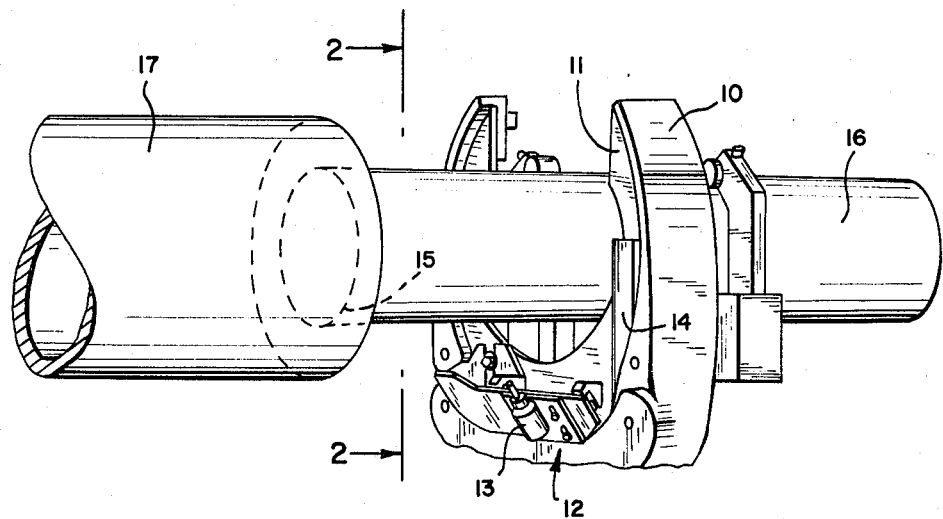
FIG. 1 is a fragmentary perspective view of an in-place weld head having a rotatable carriage for effecting 360° welds incorporating the adapter plate of this invention.

Referring first to FIG. 1, there is shown an in-place weld head structure 10 rotatably supporting a horseshoe-shaped travelling carriage 11 which serves normally to support a welding head to effect a 360° weld about a pipe.

In making a socket weld, however, it is preferable that the torch be held at an acute angle to the plane of the travelling carriage 11; that is, the plane in which the carriage 11 rotates. Towards this end, there is provided the adapter of the present invention generally indicated by the numeral 12 arranged to be secured to the weld head carriage 11 and to support a torch or weld head indicated at 13 at the desired angle. As will become clearer as the description proceeds, the adapter 12 also supports a motor 14 serving to move the weld head 13 closer to or further from the socket area to be welded. This movement is along the acute angle formed by the adapter support.

In FIG. 1, a socket area to be welded is indicated at 15 between pipes 16 and 17. This area essentially constitutes the intesection of the outer surface of the pipe end 16 where it engages a facing plate on the end of the pipe 17, the intersecting surfaces being essentially at right angles. To effect a socket weld over 360° in the socket area 15 shown in FIG. 1, the weld head 13 would preferably be oriented at 45° to the axis of the pipes 16 and 17 so as to essentially bisect the right angle formed between the two surfaces defining the socket area. In FIG. 1, the position of the socket area 15 is shown further to the left of he adapter 12 and torch head 13 than would be the case when the weld is being made merely in order to avoid obscuring the drawing.

Figure 2:
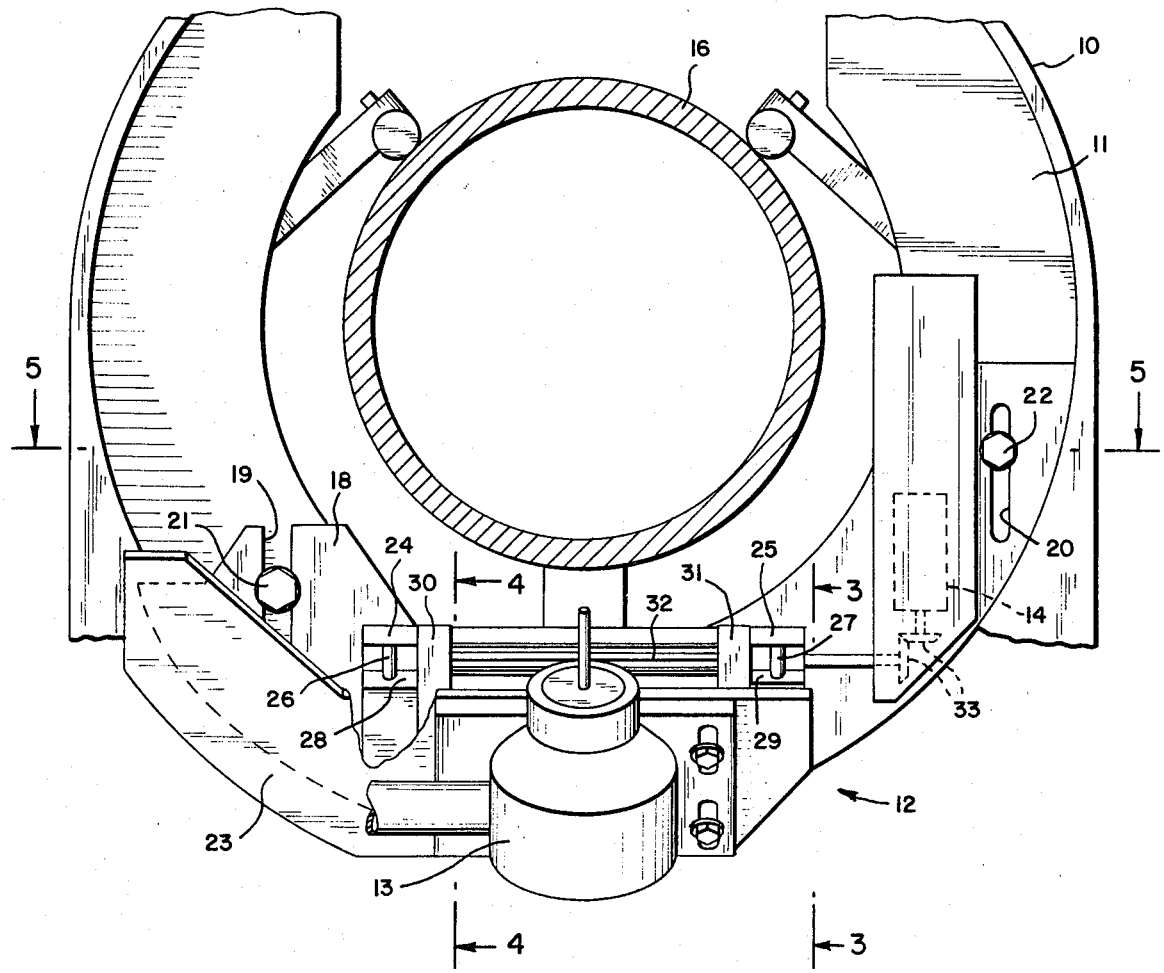
FIG. 2 is an enlarged cross section taken in the direction of the arrows 2—2 of FIG. 1.

Referring now to FIG. 2, further details of the adapter 12 and the manner in which it is secured to the horseshoe-shaped travelling carriage 11 will become evident.

Referring first in FIG. 2 to the left central portion the adapter comprises a base mounting plate 18 having left and right arms with slots 19 and 20 receiving appropriate screws 21 and 22 for securing the mounting plate 18 to the horseshoe-shaped travelling carriage 11. The slots permit some adjustment of the mounting plate 18 to bring the torch head 13 closer to or further from the axis of the pipe 16.

Referring to the lower left portion of FIG. 2, there is indicated by the numeral 23 a movable plate to which the welding head torch 13 is secured. This movable plate 23 forms an angle with the mounting plate 18, it being understood that if the mounting plate 18 is in the plane of the drawing, the movable plate 23 will be extending out of the plane of the drawing forming an acute angle therewith.

Essentially, the movable plate 23 is supported to the mounting plate 18 at an acute angle for movement in its own plane along the direction of the acute angle. This mounting means takes the form of left and right mounting fixtures having flat bottom surfaces secured to the mounting plate 18 and having top portions supporting in sloping relationship guide rods 26 and 27 defining the referred-to acute angle. Appropriate guide blocks 28 and 29 in turn are secured to the underside of the movable plate 23 and receive the guide rods 26 and 27 so that the movable plate 23 is constrained for guiding movement parallel to the rods.

Appropriate means for driving the movable plate along the guide rods to bring the welding torch 13 closer to or further away from the socket weld area take the form of left and right rack members 30 and 31 secured to the underside of the movable plate 23 adjacent to the inside faces of the fixtures 24 and 25. A single pinion 32 in turn bridges the racks 30 and 31 and is supported by and extends between the fixtures 24 and 25.

The motor 14 briefly described in FIG. 1 is shown in FIG. 2 on the right portion of the mounting plate 18 and connects through appropriate bevel gears schematically indicated at 33 to the pinion 32. Rotation of this single pinion will drive both the racks 30 and 31 to evenly provide forces on the left and right side of the movable plate 23 so that controlled and accurate movement of the torch head ensues.

Figure 3:
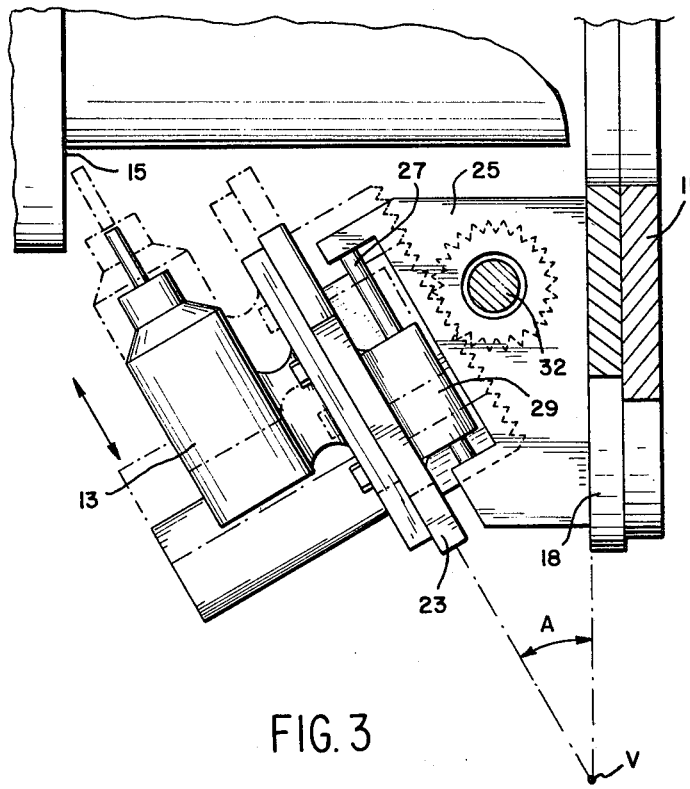
FIG. 3 is a fragmentary cross section taken in the direction of the arrows 3—3 of FIG. 2.
Figure 4:
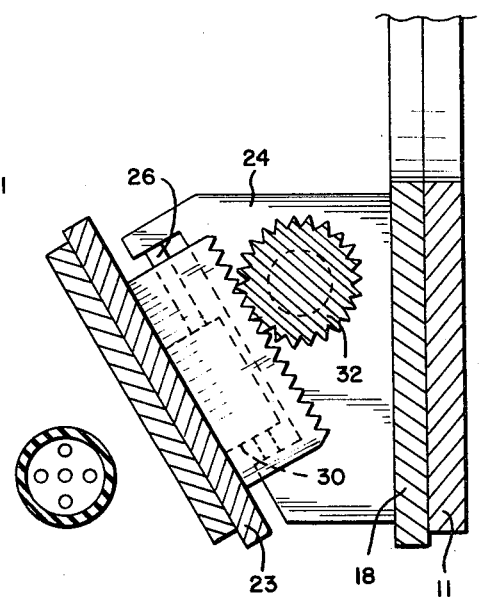
FIG. 4 is a view similar to FIG. 3 but taken in the direction of the arrows 4—4 of FIG. 2; and, FIG. 5 is a front cross section taken in the direction of the arrows 5—5 of FIG. 2.
Figure 5:
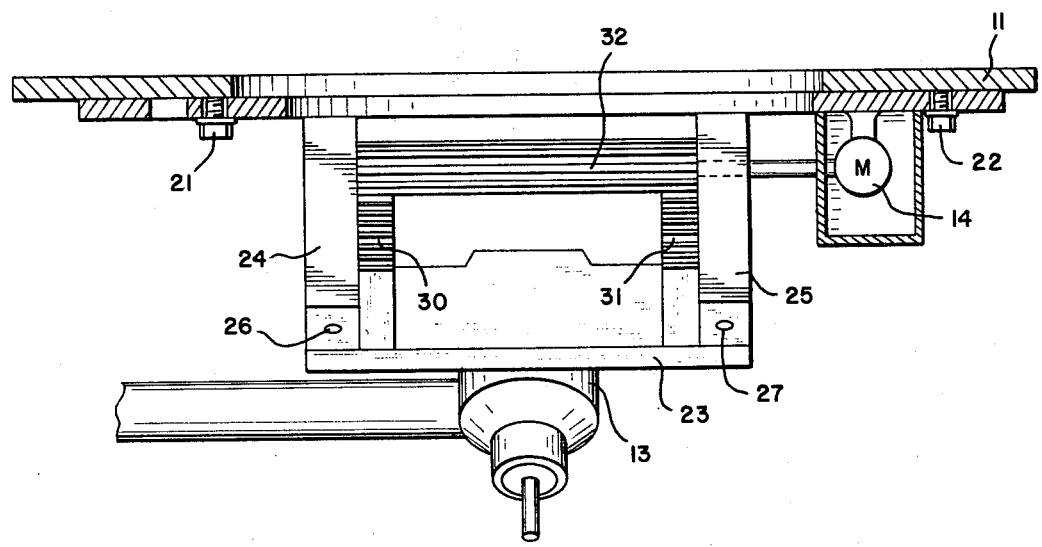

All of the foregoing will be better understood by now referring to the various cross sections taken in the direction of the arrows 3—3, 4—4 and 5—5 of FIG. 2 and as depicted respectively in FIGS. 3, 4 and 5.

Referring first to the cross section of FIG. 3, there is clearly shown the right fixture 25 wherein the same is provided with a flat bottom surface secured to the mounting plate 18 and wherein the sloping rod 27 is supported by the upper portion of the fixture 25. The rod 27 is received within a guide bore in the guide block 29 secured to the underside of the movable plate 23. Movement of the plate 23 in its own plane is evident from the phantom lined showings and it will be clear that because of the acute angle of slope of the rod 27, the movement of the movable plate 23 is towards and away from the vertex of the acute angle. In FIG. 3, the acute angle between the movable plate 23 and the mounting plate 18 is indicated at A and the vertex of this angle is indicated at V.

Also clearly shown in FIG. 3 is the manner in which the welding torch 13 is directed into the socket weld area 15 described in FIG. 1 in actually effecting a socket weld. It can be appreciated that the orientation of the weld head 13 will remain consistent upon rotation of the travelling carriage 11 supporting the mounting plate 18.

In the cross section of FIG. 4, the lefthand fixture 24 secured to the mounting plate 18 is clearly shown and a portion of the lefthand guide rod 26 similarly shown supported by the upper portion of the fixture. It will be understood that the left guide block 28 receives the rod 26 in the same manner as the guide block 29 receives the rod 27 as described in FIG. 3. In FIG. 4, the left rack member 30 eclipses the guide block 28. The right rack member 31 is similar to the rack member 30 which is shown in full view in FIG. 4 in meshing engagement with the teeth on the single pinion shaft 32. It can be appreciated that when the pinion shaft 32 is rotated, it will drive the rack member 30 in a rectilinear manner along the angle so that the movable plate 23 moves in its own plane. Further, it will be appreciated that the single pinion 32 will drive both the left and righthand rack members 30 and 31 simultaneously.

The foregoing will be clearer by referring to FIG. 5 wherein the single pinion 32 is shown bridging the left and right rack members 30 and 31 with their teeth in meshing engagement.

In operation, it should be understood that the motor 14 can be a servo motor appropriately controlled to assure an arc gap for an optimum weld for the socket area as the travelling carriage 11 rotates to carry the torch head about the pipes. Further, any nonconcentricity of the pipe orbit is automatically corrected. Thus, there is provided by the adapter plate the same advantages that the normal support for the torch head exhibits as set forth in my heretofore referred-to pending patent application together with the additional advantage of supporting the head at a desired acute angle.

Preferred embodiments of the adapter of this invention provide for an acute angle of 30° and 45°. However, it is possible to construct the fixture so as to provide an acute angle anywhere from zero degrees up to and including 45°.

From all of the foregoing, it will now be evident that the present invention has provided a useful adapter structure enabling automatic carrying-out of socket welds which were heretofore required to be carried out by hand.

Minor changes falling within the scope and spirit of this invention will occur to those skilled in the art. The adapter is therefore not to be thought of as limited to the exact construction shown for illustrative purposes.

I claim:

1. An adapter for socket welds including, in combination:
   (a) a mounting plate for securement to a weld head carriage;
   (b) a movable plate forming an acute angle with said mounting plate for carrying a welding torch;
   (c) left and right mounting fixtures having flat bottom edges secured to said mounting plate and top portions supporting in sloping relationship left and right guide rods forming said acute angle with said mounting plate;
   (d) left and right guide blocks secured to the underside of said movable plate and having bores receiving said rods to constrain said movable plate to movement parallel to said rods;
   (e) driving means for positively moving said movable plate along said guide rods comprising:

(1) left and right rack members secured to the underside of said movable plate respectively adjacent to the inside faces of said left and right fixtures, and
(2) a single elongated pinion mounted by and extending between said left and right fixtures to bridge said racks with pinion teeth in meshing engagement with the rack teeth so that rotation of said pinion simultaneously drives both said racks to effect movement of said movable plate in its own plane further from and closer to the vertex of said acute angle; and
(f) a servo motor mounted on said mounting plate and coupled to said pinion for rotating the pinion whereby a torch carried on the movable plate can be moved closer to and further from a socket area to be welded to assure an optimum weld for the socket area.

* * * * *